(12) United States Patent
Fritz

(10) Patent No.: US 9,799,203 B1
(45) Date of Patent: Oct. 24, 2017

(54) SEPARATION ALERT DEVICE

(71) Applicant: Lester Fritz, Sleepy Hollow, IL (US)

(72) Inventor: Lester Fritz, Sleepy Hollow, IL (US)

( * ) Notice: Subject to any disclaimer, the term of this patent is extended or adjusted under 35 U.S.C. 154(b) by 0 days.

(21) Appl. No.: 15/352,667

(22) Filed: Nov. 16, 2016

(51) Int. Cl.
| | |
|---|---|
| *G08B 21/24* | (2006.01) |
| *G08B 23/00* | (2006.01) |
| *G08B 21/02* | (2006.01) |
| *G08B 21/18* | (2006.01) |
| *G08B 13/14* | (2006.01) |
| *G06F 1/16* | (2006.01) |
| *H04M 1/725* | (2006.01) |
| *G06F 1/32* | (2006.01) |

(52) U.S. Cl.
CPC ......... *G08B 21/24* (2013.01); *G08B 13/1427* (2013.01); *G08B 21/0247* (2013.01); *G08B 21/0291* (2013.01); *G08B 21/182* (2013.01); *G08B 23/00* (2013.01); *G06F 1/1626* (2013.01); *G06F 1/3231* (2013.01); *H04M 1/7253* (2013.01)

(58) Field of Classification Search
CPC  G08B 21/24; G08B 13/1427; G08B 21/0247; G08B 21/182; G08B 21/0291; G08B 23/00; H04M 1/7253; G06F 1/1626; G06F 1/3231
See application file for complete search history.

(56) References Cited

U.S. PATENT DOCUMENTS

| | | | |
|---|---|---|---|
| 5,583,488 A | 12/1996 | Sala et al. | |
| 5,708,421 A | 1/1998 | Boyd | |
| 5,796,338 A | 8/1998 | Mardirossian | |
| D503,851 S | 4/2005 | Landow | |
| 7,259,671 B2 | 8/2007 | Ganley et al. | |
| 7,973,657 B2 | 7/2011 | Ayed | |
| 8,351,980 B2 | 1/2013 | Wakefield | |
| 9,311,586 B2* | 4/2016 | Robinette | G08B 13/1427 |
| 2005/0200487 A1* | 9/2005 | O'Donnell | A62B 99/00 340/573.1 |
| 2009/0040053 A1* | 2/2009 | White | G08B 21/0288 340/573.4 |
| 2010/0295665 A1* | 11/2010 | Landau | G06Q 10/087 340/10.42 |

(Continued)

FOREIGN PATENT DOCUMENTS

WO    WO 9834417    8/1998

*Primary Examiner* — Mohamed Barakat

(57) ABSTRACT

A separation alert device for warning a user of separation from an item includes a housing that defines an internal space. The housing is configured for retention on the user's person. A power module, a microprocessor, a first proximity sensor and a plurality of alarms are coupled to the housing and are positioned in the internal space. The microprocessor is operationally coupled to the power module. The first proximity sensor and the alarms are operationally coupled to the microprocessor. A second proximity sensor is in wireless communication with the microprocessor. The second proximity sensor is coupled to an item that the user desires to retain proximate to the user. The microprocessor is positioned to receive a location signal from the second proximity sensor. Separation of the first proximity sensor by a preset distance from the second proximity sensor will compel the microprocessor to compel the alarms to notify the user.

11 Claims, 4 Drawing Sheets

(56) References Cited

U.S. PATENT DOCUMENTS

| | | | |
|---|---|---|---|
| 2015/0350413 A1* | 12/2015 | Ma | H04M 1/72577 |
| | | | 455/418 |
| 2016/0049069 A1* | 2/2016 | Oliveira | G08B 25/10 |
| | | | 340/539.11 |
| 2016/0055732 A1* | 2/2016 | Howard | G08B 21/0272 |
| | | | 340/539.13 |
| 2016/0225249 A1* | 8/2016 | Caputo | G08B 21/24 |
| 2016/0266606 A1* | 9/2016 | Ricci | G06F 1/163 |

* cited by examiner

SEPARATION ALERT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to alert devices and more particularly pertains to a new alert device for warning a user of separation from an item.

BRIEF SUMMARY OF THE INVENTION

An embodiment of the disclosure meets the needs presented above by generally comprising a housing that defines an internal space. The housing is configured for retention on the user's person. A power module, a microprocessor, a first proximity sensor and a plurality of alarms are coupled to the housing and are positioned in the internal space. The microprocessor is operationally coupled to the power module. The first proximity sensor and the plurality of alarms are operationally coupled to the microprocessor. A second proximity sensor is in wireless communication with the microprocessor. The second proximity sensor is coupled to an item that the user desires to retain proximate to the user. The microprocessor is positioned to receive a location signal from the second proximity sensor. Separation of the first proximity sensor by a preset distance from the second proximity sensor will compel the microprocessor to compel the plurality of alarms to notify the user that the first proximity sensor is no longer within the preset distance to the second proximity sensor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
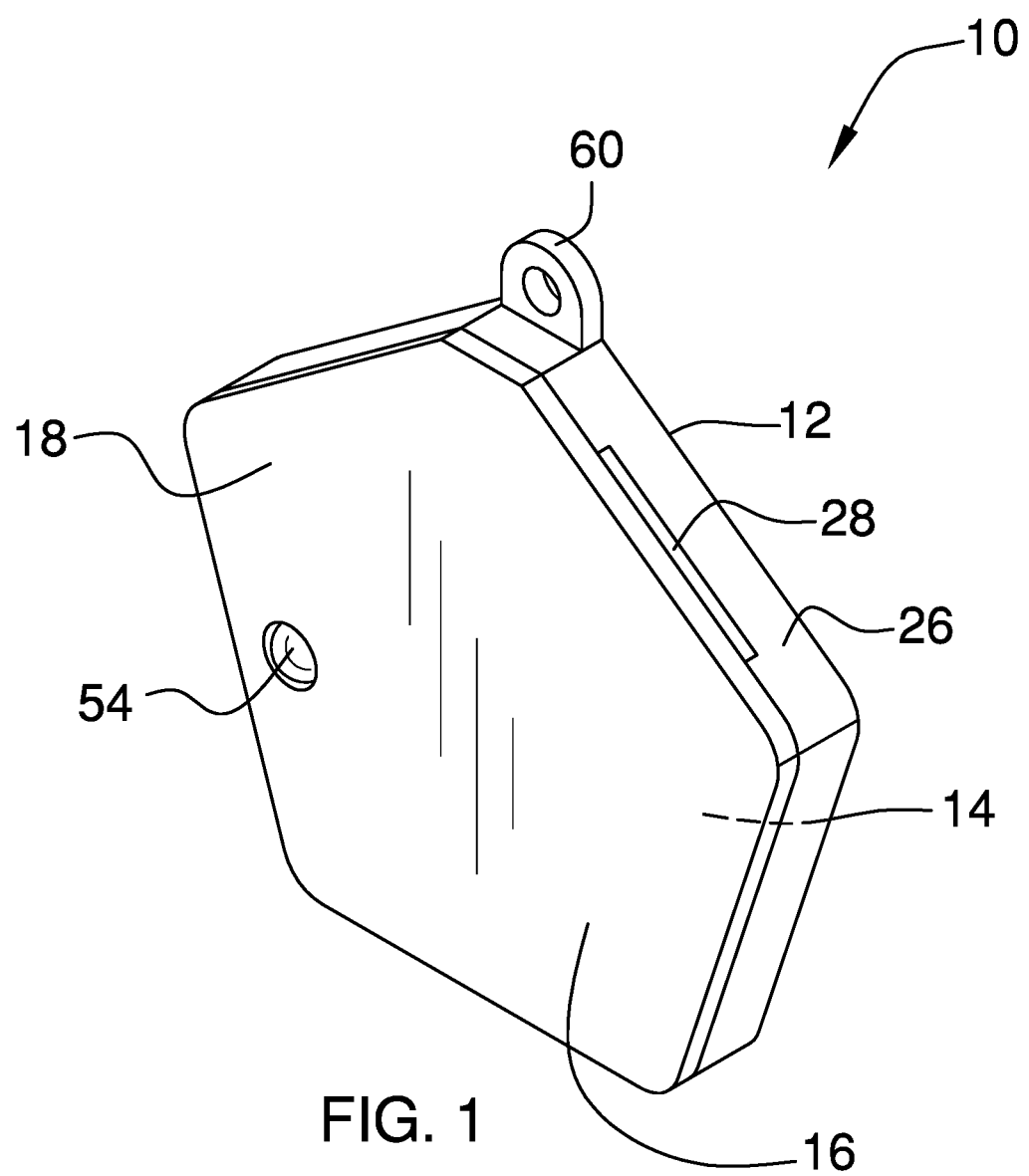
FIG. 1 is an isometric perspective view of a separation alert device according to an embodiment of the disclosure.
Figure 2:
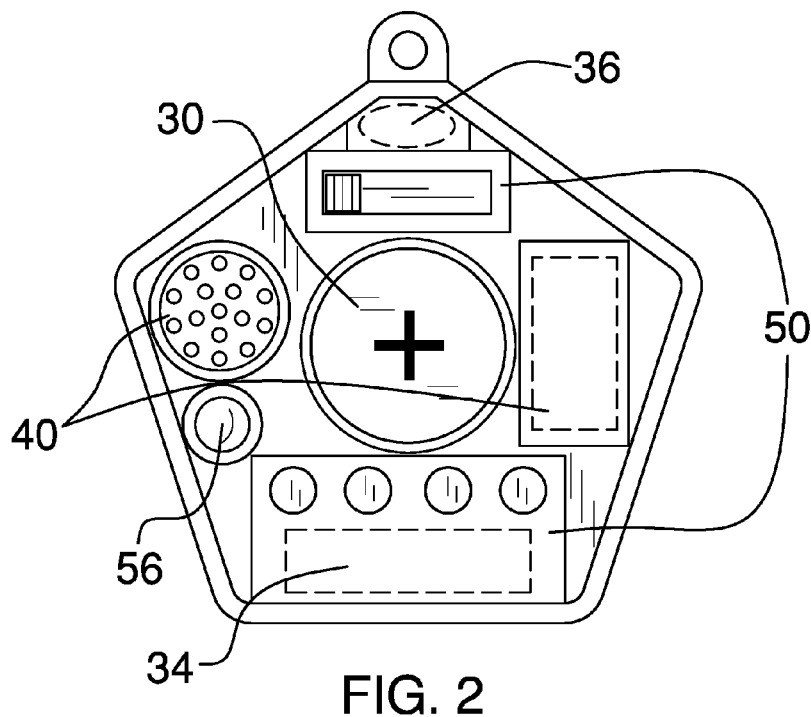
FIG. 2 is a front view of an embodiment of the disclosure.
Figure 3:
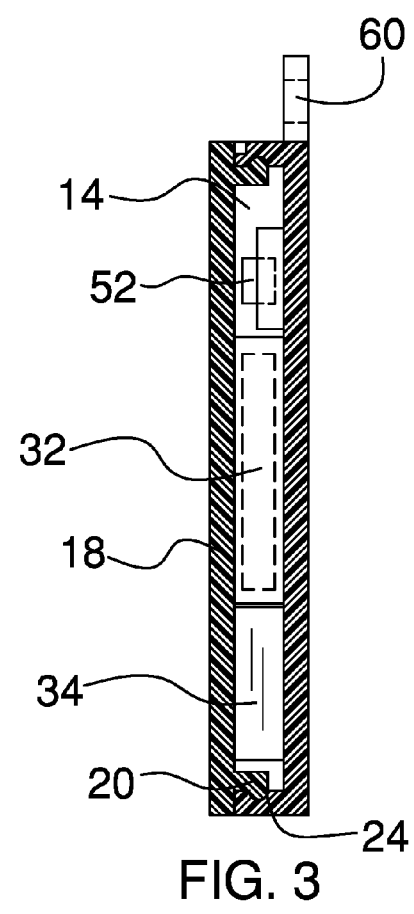
FIG. 3 is a cross-sectional view of an embodiment of the disclosure.
Figure 4:
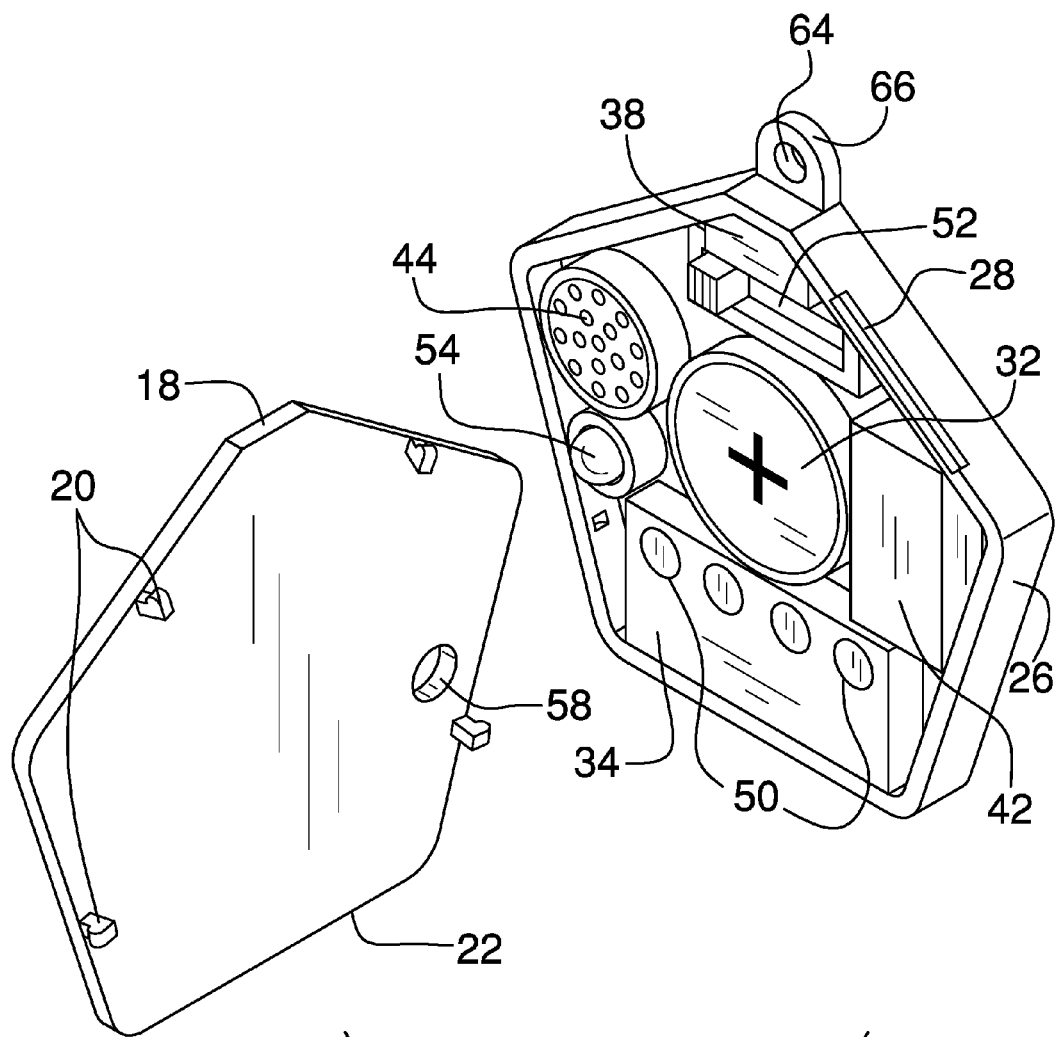
FIG. 4 is an exploded view of an embodiment of the disclosure.
Figure 5:
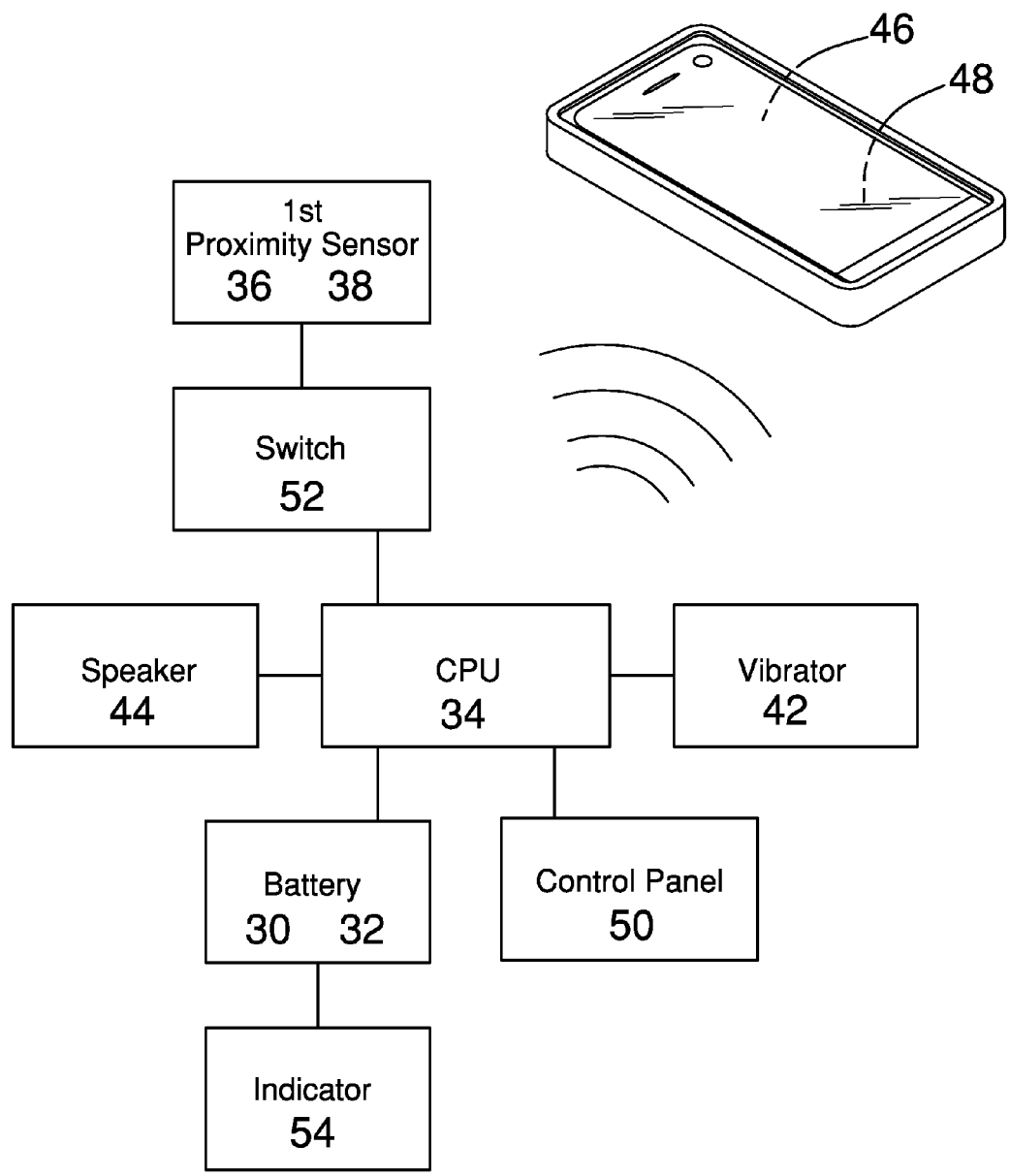
FIG. 5 is a block diagram of an embodiment of the disclosure.

With reference now to the drawings, and in particular to FIGS. 1 through 5 thereof, a new alert device embodying the principles and concepts of an embodiment of the disclosure and generally designated by the reference numeral 10 will be described.

As best illustrated in FIGS. 1 through 5, the separation alert device 10 generally comprises a housing 12 that defines an internal space 14. The housing 12 is configured to be retained on a user's person. The housing 12 has a front 16 that is open. In one embodiment, the housing 12 is pentagonally shaped when viewed from the front 16. A cover 18 that is complementary to the front 16 of the housing 12 is configured to reversibly couple to the housing 12. In another embodiment, a plurality of latches 20 is coupled to the cover 18 proximate to a perimeter 22 of the cover 18. Each latch 20 is positioned to couple to a respective notch 24 that is positioned in a sidewall 26 of the housing 12. A slot 28 is positioned in the sidewall 26 of the housing 12 adjacent to the front 16. The slot 28 is configured to insert an object, such as a user's fingernail, to decouple the cover 18 from the housing 12.

A power module 30 is coupled to the housing 12 and is positioned in the internal space 14. In one embodiment, the power module 30 comprises at least one battery 32. A microprocessor 34 is coupled to the housing 12 and is positioned in internal space 14. The microprocessor 34 is operationally coupled to the power module 30.

A first proximity sensor 36 is coupled to the housing 12 and is positioned in the internal space 14. The first proximity sensor 36 is operationally coupled to the microprocessor 34. In one embodiment, the first proximity sensor 36 comprises a first global positioning system receiver 38.

A plurality of alarms 40 is coupled to the housing 12 and is positioned in the internal space 14. The alarms 40 are operationally coupled to the microprocessor 34. In one embodiment, the plurality of alarms 40 comprises a vibrator 42. The microprocessor 34 is positioned to compel the vibrator 42 to vibrate as a warning to the user. In another embodiment, the plurality of alarms 40 comprises a speaker 44. The microprocessor 34 is positioned to compel the speaker 44 to emit an audible signal as a warning to the user.

A second proximity sensor 46 is in wireless communication with the microprocessor 34. The second proximity sensor 46 is coupled to an item that the user desires to retain proximate to the user. In one embodiment, the second proximity sensor 46 comprises a second global positioning system receiver 48.

A control panel 50 is coupled to the housing 12 and is positioned in the internal space 14. The control panel 50 is operationally coupled to the microprocessor 34. The control panel 50 is configured to selectively activate at least one of the plurality of alarms 40. The control panel 50 also is configured to wirelessly couple the microprocessor 34 to the second proximity sensor 46. In one embodiment, the control panel 50 comprises a switch 52. The switch 52 is configured to select a separation distance between the first proximity sensor 36 and the second proximity sensor 46 that will activate the plurality of alarms 40.

An indicator 54 is coupled to the housing 12. The indicator 54 is operationally coupled to the power module 30. The indicator 54 is configured to notify the user when the power module 30 is approaching depletion. In one embodiment, the indicator 54 comprises a light 56. The light 56 is visible through a hole 58 that is positioned in the cover 18.

A coupler 60 is coupled to the housing 12. The coupler 60 is positioned on the housing 12 such that the coupler 60 is configured to couple to an object, such as a ring of a keychain, selected by the user. In one embodiment, the coupler 60 comprises a tab 62 that is coupled to and extends transversely from the sidewall 26. A penetration 64 is positioned through the tab 62.

In use the housing 12 is configured to be retained on the user's person. The second proximity sensor 46 is configured to couple to the item that the user desires to retain proximate to the user. The microprocessor 34 is positioned to receive the location signal from the second proximity sensor 46. Separation of the first proximity sensor 36 by a preset distance from the second proximity sensor 46 will compel the microprocessor 34 to compel the plurality of alarms 40 to notify the user that the first proximity sensor 36 is no longer within the preset distance to the second proximity sensor 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A separation alert device comprising:
a housing defining an internal space, said housing being configured for retention on the user's person, said housing having a front, said front being open,
a cover complementary to said front of said housing, said cover being configured for reversible coupling to said housing,
a plurality of latches coupled to said cover proximate to a perimeter of said cover, each said latch being positioned to couple to a respective notch positioned in a sidewall of said housing;
a power module coupled to said housing and positioned in said internal space;
a microprocessor coupled to and positioned in said housing, said microprocessor being operationally coupled to said power module;
a first proximity sensor coupled to said housing and positioned in said internal space, said first proximity sensor being operationally coupled to said microprocessor;
a plurality of alarms coupled to said housing and positioned in said internal space, said alarms being operationally coupled to said microprocessor;
a second proximity sensor in wireless communication with said microprocessor, said second proximity sensor being coupled to an item that the user desires to retain proximate to the user;
a coupler coupled to said housing, wherein said coupler is positioned on said housing such that said coupler is configured for coupling to an object, wherein the object is a ring of a keychain, said coupler comprising:
a tab coupled to and extending transversely from said sidewall, and
a penetration positioned through said tab; and
wherein said housing is configured for retention on the user's person, wherein said second proximity sensor is configured for coupling to an item that the user desires to retain proximate to the user, such that said microprocessor is positioned to receive a location signal from said second proximity sensor, wherein separation of said first proximity sensor by a preset distance from said second proximity sensor will compel said microprocessor to compel said plurality of alarms to notify the user that said first proximity sensor is no longer within the preset distance to said second proximity sensor.

2. The device of claim 1, further including a slot positioned in said sidewall of said housing adjacent to said front, said slot being configured for insertion of an object, wherein the object is a user's fingernail, to decouple said cover from said housing to the second user after the second user logs into the tracking service network.

3. The device of claim 1, further including said housing being pentagonally shaped when viewed from said front.

4. The device of claim 1, further including said power module comprising at least one battery.

5. The device of claim 1, further comprising:
said first proximity sensor comprising a first global positioning system receiver; and
said second proximity sensor comprising a second global positioning system receiver.

6. The device of claim 1, further including said plurality of alarms comprising a vibrator, wherein said microprocessor is positioned to compel said vibrator to vibrate as a warning to the user.

7. The device of claim 1, further including said plurality of alarms comprising a speaker, wherein said microprocessor is positioned to compel said speaker to emit an audible signal as a warning to the user.

8. The device of claim 1, further including a control panel coupled to said housing and positioned in said internal space, said control panel being operationally coupled to said microprocessor, said control panel being configured for selectively activating at least one of said plurality of alarms, said control panel being configured for wirelessly coupling said microprocessor to said second proximity sensor.

9. The device of claim 8, further including said control panel comprising a switch, said switch being configured for selection of separation distances between said first proximity sensor and said second proximity sensor that will activate said plurality of alarms.

10. The device of claim 1, further including an indicator coupled to said housing, said indicator being operationally coupled to said power module, wherein said indicator is configured to notify the user when said power module is approaching depletion, said indicator comprising a light, said light being visible through a hole positioned in said cover.

11. A separation alert device comprising:
- a housing defining an internal space, said housing being configured for retention on the user's person, said housing having a front, said front being open, said housing being pentagonally shaped when viewed from said front;
- a cover complementary to said front of said housing, said cover being configured for reversible coupling to said housing,
- a plurality of latches coupled to said cover proximate to a perimeter of said cover, each said latch being positioned to couple to a respective notch positioned in a sidewall of said housing;
- a slot positioned in said sidewall of said housing adjacent to said front, said slot being configured for insertion of an object, wherein the object is a user's fingernail, to decouple said cover from said housing;
- a power module coupled to said housing and positioned in said internal space, said power module comprising at least one battery;
- a microprocessor coupled to said housing and positioned in said internal space, said microprocessor being operationally coupled to said power module;
- a first proximity sensor coupled to said housing and positioned in said internal space, said first proximity sensor being operationally coupled to said microprocessor, said first proximity sensor comprising a first global positioning system receiver;
- a plurality of alarms coupled to said housing and positioned in said internal space, said alarms being operationally coupled to said microprocessor, said plurality of alarms comprising a vibrator, wherein said microprocessor is positioned to compel said vibrator to vibrate as a warning to the user, said plurality of alarms comprising a speaker, wherein said microprocessor is positioned to compel said speaker to emit an audible signal as a warning to the user;
- a second proximity sensor in wireless communication with said microprocessor, said second proximity sensor being coupled to an item that the user desires to retain proximate to the user, said second proximity sensor comprising a second global positioning system receiver; and
- a control panel coupled to said housing and positioned in said internal space, said control panel being operationally coupled to said microprocessor, said control panel being configured for selectively activating at least one of said plurality of alarms, said control panel being configured for wirelessly coupling said microprocessor to said second proximity sensor, said control panel comprising a switch, said switch being configured for selection of separation distances between said first proximity sensor and said second proximity sensor that will activate said plurality of alarms;
- an indicator coupled to said housing, said indicator being operationally coupled to said power module, wherein said indicator is configured to notify the user when said power module is approaching depletion, said indicator comprising a light, said light being visible through a hole positioned in said cover;
- a coupler coupled to said housing, wherein said coupler is positioned on said housing such that said coupler is configured for coupling to an object, wherein the object is a ring of a keychain, said coupler comprising: a tab coupled to and extending transversely from said sidewall, and a penetration positioned through said tab;
- wherein said housing is configured for retention on the user's person, wherein said second proximity sensor is configured for coupling to the item that the user desires to retain proximate to the user, such that said microprocessor is positioned to receive the location signal from said second proximity sensor, wherein separation of said first proximity sensor by a preset distance from said second proximity sensor will compel said microprocessor to compel said plurality of alarms to notify the user that said first proximity sensor is no longer within the preset distance to said second proximity sensor.

* * * * *